United States Patent [19]

Nakashima et al.

[11] Patent Number: 4,728,247
[45] Date of Patent: Mar. 1, 1988

[54] INDUSTRIAL ROBOT

[75] Inventors: Seiichiro Nakashima; Kenichi Toyoda, both of Hino; Nobutoshi Torii, Hachioji; Hitoshi Mizuno, Hino, all of Japan

[73] Assignee: Fanuc Ltd., Yamanashi, Japan

[21] Appl. No.: 834,274

[22] PCT Filed: Jun. 28, 1985

[86] PCT No.: PCT/JP85/00366
§ 371 Date: Feb. 20, 1986
§ 102(e) Date: Feb. 20, 1986

[87] PCT Pub. No.: WO86/00255
PCT Pub. Date: Jan. 16, 1986

[30] Foreign Application Priority Data

Jun. 29, 1984 [JP] Japan .................. 59-133001

[51] Int. Cl.$^4$ .............................................. B66C 23/72
[52] U.S. Cl. ..................... 414/680; 16/289;
248/292.1; 414/720; 901/48
[58] Field of Search ...................... 414/680, 719, 720;
901/15, 48; 248/292.1, 280.1, 364, 123.1; 16/1
C, 289, 306

[56] References Cited

U.S. PATENT DOCUMENTS

| 2,940,459 | 6/1960 | Dotterer et al. | 414/719 X |
| 3,850,307 | 11/1974 | Motoda | 901/48 X |
| 4,383,455 | 5/1983 | Tuda et al. | 248/292.1 |
| 4,500,251 | 2/1985 | Kiryu et al. | 248/292.1 X |
| 4,546,233 | 10/1985 | Yasuoka | 414/719 X |

FOREIGN PATENT DOCUMENTS 51-58252 5/1976 Japan .
54-95456 1/1978 Japan .
57-140996 9/1982 Japan .
58-137578 3/1983 Japan .

Primary Examiner—Frank E. Werner
Assistant Examiner—Donald W. Underwood
Attorney, Agent, or Firm—Armstrong, Nikaido, Marmelstein & Kubovcik

[57] ABSTRACT

The industrial robot comprises a lower arm (13) provided on a robot body (12) pivotably about a first horizontal axis (C1). The lower arm (13) has provided thereon a forearm (14) pivotably about a second horizontal axis (C2). The forearm (14) is rotationally driven by a drive such as a motor (16). The robot body (12) has provided thereon a rotating disk (17) interlocked with the pivoting of the forearm (14) about the second axis (C2) and rotatable about the first axis (C1). Also the rotating disk (17) has secured thereon a first wheel (18) and coaxial therewith, the diameter of which is smaller than that of the disk. There is further provided a tension spring assembly (19) having one end thereof connected to the robot body (12) and which has rotatably mounted at the other end thereof a second wheel (21) having nearly the same diameter as that of the first wheel. Also provided is a chain (22) having one end thereof connected to the rotating disk (17) and the other end engaged on the first wheel (18). This chain (22) is engaged on the outer circumference of the second wheel (21) while pulling the tension spring assembly (19). The one end of the chain (22) is so disposed on the rotating disk (17) that when the upper end of the forearm (14) is directed normally downward, the chain portion (22b) between the rotating disk (17) and the second wheel (21) is substantially parallel to the chain portion (22c) between the first and second wheels (18) and (21).

6 Claims, 4 Drawing Figures

INDUSTRIAL ROBOT

TECHNICAL FIELD

The present invention relates to an industrial robot, and more specifically, to a forearm weight balancing mechanism for use with robots with articulated arms.

BACKGROUND ART

Industrial robots are well known with articulated arms which comprise a lower arm provided on the robot body pivotably about a first horizontal axis, a forearm provided on the lower arm pivotably about a second horizontal axis, and a wrist assembly provided on the forearm. Generally, in industrial robots of this type, the robot body has a forearm drive motor provided thereon. The revolution of the output shaft of the motor is transmitted to a first sprocket fixed to the lower arm coaxially with the first axis, and the revolution of the first sprocket is conveyed by means of a chain to a second sprocket fixed to the forearm coaxially with the second horizontal axis.

In robots with articulated arms of the above-mentioned type, the movement of the forearm itself normally ranges from a generally horizontal position or a position where it is slightly tilted upward toward the upper end thereof, to a position at which the upper end is directed nearly normally downward. In robots of this type, a moment yielded around the first axis due to the weight of the forearm and wrist mechanism is applied to the forearm drive motor by means of a revolution transmitting mechanism; however, since this moment due to the weight varies as the forearm is tilted, the drive torque of the forearm drive motor will vary according to the tilt angle of the forearm. Normally, when the forearm is in the normal or standing position, the moment due to the weight is at its largest. As the upper end of the forearm is tilted downward, the moment decreases along a cos curve. When the upper end of the forearm is directed normally downward, the moment due to the weight is zero. To provide a moment opposite to such a moment, a forearm weight balancing mechanism is incorporated in the conventional robots. FIG. 4 schematically illustrates the structure of a prior-art forearm weight balancing mechanism. As seen in FIG. 4, the movable body has provided thereon a rotating disk 2 interlocked with a forearm 1 and rotatable about the first axis C1. A tension spring assembly 3 has one end 3a thereof coupled to the robot body (not shown) and the other end 3b coupled to the rotating disk 2.

The forearm weight balancing mechanism of the above-mentioned type works as follows: Against the moment M yielded around the second axis C2 due to the weight acting on the forearm 1, an opposite moment −M is provided around the first axis C1 by the resilient force of the tension spring assembly 3; however, since the pulling force of the tension spring assembly 3 increases as the forearm 1 is tilted downward from the normal or standing position, the opposite moment −M due to the tension spring assembly 3 increases as the forearm 1 is tilted normally downward so that it will not be in balance with the moment M due to the weight.

DISCLOSURE OF THE INVENTION

Therefore, the object of the present invention is to overcome the above-mentioned drawbacks of the prior art by providing an improved and novel industrial robot. This object can be attained by providing an industrial robot, according to the present invention, comprising: a robot body, a lower arm provided on the robot body pivotably about a first horizontal axis, a forearm provided on the lower arm pivotably about a second horizontal axis, and means of rotationally driving the forearm, the robot body having provided thereon a rotating disk interlocked with the pivoting of the forearm about the second axis and rotatable about the first axis, the rotating disk having secured thereon a first wheel having a diameter smaller than that of the rotating disk, there being provided a tension spring assembly having one end thereof coupled with said robot body and having rotatably mounted at the other end thereof a second wheel having a same diameter as that of the first wheel, also a chain means having one end thereof connected to the rotating disk and the other end connected to the first wheel and engaged on the outer circumference thereof being engaged on the outer circumference of the second wheel while pulling the tension spring assembly, the one end of the chain means being so disposed on the rotating disk that when the upper end of the forearm is directed normally downward, the chain portion between the rotating disk and the second wheel is generally parallel to the chain portion between the first and second wheels.

In a robot according to the present invention, against a moment developed around the second axis due to the weight of the forearm, wrist mechanism, etc., an opposite moment is provided due to the resilient force of the tension spring assembly; the magnitude of this opposite moment is a difference between the first moment created around the first axis due to the tension acting on the chain portion between the rotating disk and the second and the second moment directed in the opposite direction and developed around the first axis due to the tension acting on the chain portion between the first and second wheels. Since both chain portions are generally parallel to each other when the upper end of the forearm is directed normally downward, the first and second moments are nearly equal in magnitude to each other so that the opposite moment developed due to the resilient force of the tension spring assembly is substantially zero. As the forearm is tilted or pivoted toward the horizontal position, the first moment increases while the second moment remains substantially constant, so the opposite moment due to the tension spring assembly will increase generally in line with the increase of the moment due to the weight. Therefore, an industrial robot can be provided in which the variation of the drive torque of the forearm drive motor can be reduced.

These and other objects and advantages of the present invention will be better understood from the ensuing description, made by way of example, of the embodiment according to the present invention with reference to the drawings.

BEST MODE FOR CARRYING OUT THE INVENTION

Figure 1:
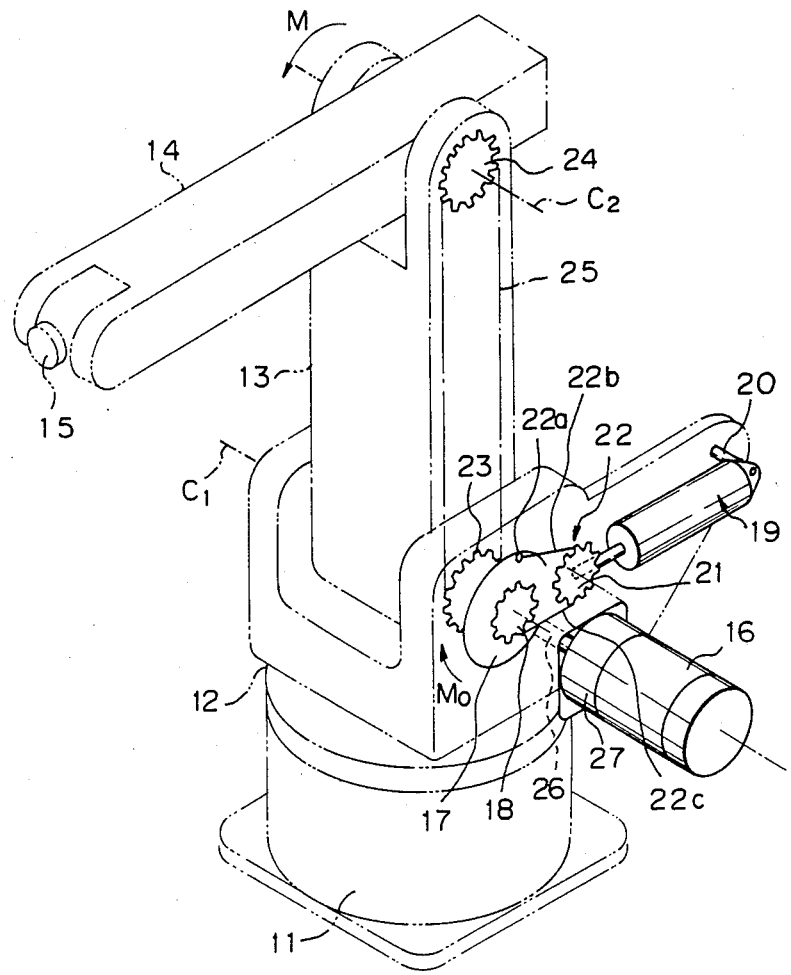
FIG. 1 is a schematic, perspective view of the industrial robot, showing one embodiment of the present invention.

FIG. 1 schematically illustrates the entire structure of the industrial robot with articulated arms. As seen in this Figure, the robot comprises a fixed robot base 11, moving body 12 so mounted on the robot base 11 as to be horizontally rotatable in use, a lower arm 13 mounted on the moving body 12 rotatably about a first horizontal axis C1, a forearm 14 mounted on the lower arm 13 rotatably about a second horizontal axis C2, and a wrist assembly 15 rotatably mounted on the end of the forearm 14. In this embodiment, the moving body 12 has mounted thereon a motor for rotational drive of the forearm 14 and a motor (not shown) for rotational drive of the lower arm 13.

The moving body 12 has rotatably provided thereon a rotating disk 17 interlocked with the pivoting of the forearm 14 about the second axis C2 and having secured thereon a first sprocket 18 having a diameter smaller than the diameter thereof. A tension spring assembly 19 is provided having one end thereof held by the moving body 12 by means of a pin 20 and having a second sprocket 21 rotatably mounted at the other end, the diameter of which is nearly the same as that of the first sprocket 18. Also provided is a chain 22 having one end 22a thereof held on the circumferential edge of the rotating disk 17 and the other end held as engaged on the first sprocket 18. The intermediate portion of the chain 22 is engaged on the second sprocket while pulling the tension spring assembly 19. The one end of the chain 22 is so disposed on the rotating disk 17 that when the upper end of the forearm 14 is directed normally downward, the chain portion 22b between the rotating disk 17 and the second sprocket 21 is generally parallel to the chain portion 22c between the first and second sprockets 18 and 21.

According to this embodiment, the rotating disk 17 is fixed to a third sprocket 23 rotatable about the first axis C1, and the forearm 14 has fixed thereon a fourth sprocket 24 having a same diameter as that of the third sprocket 23 and rotatable about the second axis C2, the third and fourth sprockets 23 and 24 being connected with each other by means of an endless chain 25. The rotating disk 17 and the first and third sprockets 18 and 23 are mounted on a forearm drive shaft 26 extending along the first axis C1 and coupled to the output shaft of the motor 16 by means of a reduction gear 27.

Figure 2:
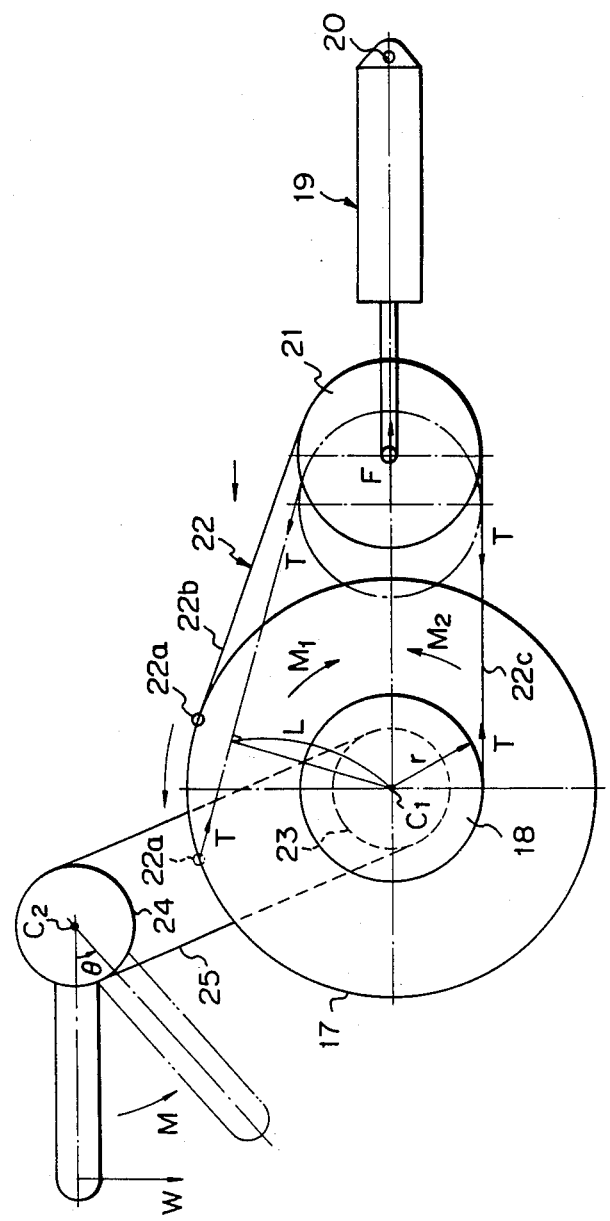
FIG. 2 is a schematic side elevation of the forearm weight balancing mechanism of the robot shown in FIG. 1.

In the robot of the above-mentioned structure, a moment M is created around the second axis C2 in the counterclockwise direction as viewed in FIG. 2 due to the weight W of the forearm 14, wrist mechanism 15, etc. This moment M is conveyed from the fourth sprocket 24 to the third sprocket 23 and the rotating disk 17 via the chain 25. On the other hand, since the resilient force of the tension spring assembly 19 acts on the chain 22, the tension T acts on the chain portions 22b and 22c, respectively, and thus on the rotating disk 17 and the first sprocket 18. So, a moment M1 ($M1=T\times L$) is developed around the first axis C1 in the clockwise direction due to the tension T of the chain portions 22b and 22c and an opposite-directional moment M2 ($M2=T\times r$) is created around the first axis C1 in the counterclockwise direction due to the tension T of the chain portion 22c. Consequently, an opposite moment M0 ($M0=M1-M2$) is yielded around the first axis C1 against the moment M. Because $L\geq r$, $M\geq M2$.

When the forearm 14 is in the horizontal position, the counterclockwise moment M developed around the first axis C1 due to the weight becomes a maximum, and as the forearm 14 is tilted or pivoted downward from the horizontal position, the moment M decreases. Finally the moment M will be zero when the upper end of the forearm 14 is directed normally downward. On the other hand, since the chain portions 22b and 22c are so set as to be substantially parallel to each other when the upper end of the forearm 14 is directed normally downward, the radii L and r of the moment are equal to each other when the upper end of the forearm 14 is directed normally downward, namely, M1 = M2. Consequently, the clockwise opposite moment M0 developed by the tension spring assembly 19 becomes zero and a balance is obtained with the counterclockwise moment M.

Figure 3:
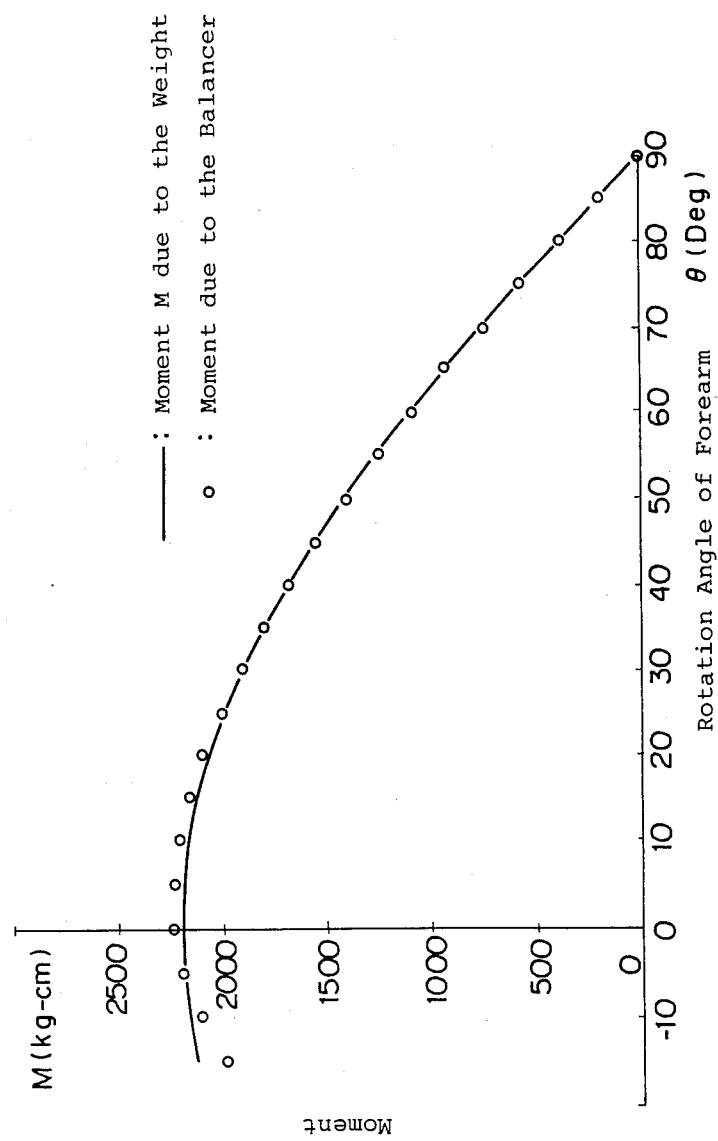
FIG. 3 graphically shows the balancing between the tilt angle or angular position of the forearm under the assumption that the horizontal position of the forearm is taken as 0°, and the moment arond the second axis, in the embodiment of FIG. 1.
Figure 4:
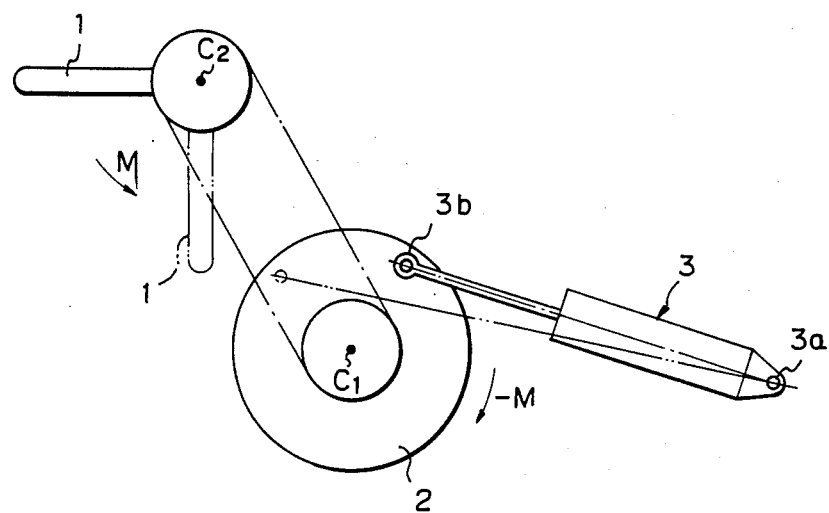
FIG. 4 is a schematic view of the forearm weight balancing mechanism used with the prior-art industrial robot.

FIG. 3 shows the relationship between the moment M due to the weight of the forearm 14, etc. and the moment M0 developed by the tension spring assembly 19 when the forearm takes each of various angular positions $\theta$, under the assumption that the tilt angle or angular position of the forearm 14 in the horizontal position is taken as 0° while the angular position of the forearm directed normally downward is taken as 90°, in this embodiment. In this Figure, the solid-line curve indicates the change in magnitude of the moment M due to the weight and the small circles indicate the magnitudes of the opposite moment M0 in various angulation positions. FIG. 3 proves that having a nearly same magnitude, both the moments M and M0 are in balance with each other in a tilt-angle range of $-15°$ to $90°$ which is the norl moving range of the forearm 14.

The present invention has been described concerning one embodiment in the foregoing. However, it is not limited only to this embodiment but it can be embodied in various forms without departing from the scope of the claims which will be described later. For example, toothed pulleys may be used for the first to fourth sprockets 18, 21, 23, and 24, and toothed belts may be used for the chains 22 and 25.

CAPABILITY OF EXPLOITABILITY IN INDUSTRY

According to the present invention, it is possible to reduce the drive torque variation of the forearm drive motor in various industrial robots with articulated arms. Therefore, the present invention can provided an industrial robot with articulated arms provided with a compact and lightweight forearm drive motor.

We claim:

1. An industrial robot, comprising:
   a robot body;
   a lower arm provided on said robot body pivotably about a first horizontal axis;
   a forearm provided on said lower arm pivotably about a second horizontal axis; and
   means of rotationally driving said forearm;
   said robot body having provided thereon a rotating disk interlocked with the pivoting of said forearm about said second axis and which is rotatable about said first axis, said rotating disk having secured thereon a first wheel having a diameter smaller than that of said rotating disk, there being provided a tension spring assembly having one end mounted on the robot body and the other end being free and having a second wheel mounted thereon, said second wheel having a same diameter as that of said first wheel, also a chain means having one end thereof connected to said rotating disk and the other end connected to said first wheel and engaged on the outer circumference thereof being engaged on the outer circumference of said second wheel while pulling said tension spring assembly, the one end of said chain means being so disposed on said rotating disk that when the upper end of said forearm is directed normally downward, the chain portion between said rotating disk and said second wheel is generally parallel to the chain portion between said first and second wheels.

2. An industrial robot as set forth in claim 1, said rotating disk being fixed to a third wheel rotatable about said first axis, said forearm having fixed thereon a fourth wheel having a same diameter as that of said third wheel and rotatable about said second axis, said third and fourth wheels being connected to each other by means of an endless chain.

3. An industrial robot as set forth in claim 2, in which said forearm driving means comprises a motor provided on said robot body, the output shaft of said motor being coupled to said third wheel.

4. An industrial robot as set forth in claim 1, in which said first and second wheels are sprockets and said means is a chain.

5. An industrial robot as set forth in claim 1, said first and second wheels are toothed pulleys, respectively, and said means is a toothed belt.

6. An industrial robot as set forth in claim 1, wherein said robot body is pivotably provided on a fixed base.

* * * * *